(12) United States Patent
Abdelrahman (10) Patent No.: US 11,939,874 B2
(45) Date of Patent: Mar. 26, 2024

(54) SWITCHING VALVE (71) Applicant: PRATT & WHITNEY CANADA CORP., Longueuil (CA)

(72) Inventor: Ahmed Abdelrahman, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/805,046

(22) Filed: Jun. 2, 2022

(65) Prior Publication Data

US 2023/0392512 A1 Dec. 7, 2023

(51) Int. Cl.
*F01D 17/14* (2006.01)

(52) U.S. Cl.
CPC ...... *F01D 17/145* (2013.01); *F05D 2220/323* (2013.01); *F05D 2250/182* (2013.01); *F05D 2260/31* (2013.01); *F05D 2260/36* (2013.01); *F05D 2260/606* (2013.01)

(58) Field of Classification Search
CPC ............ F01D 17/145; F05D 2220/323; F05D 2250/182; F05D 2260/31; F05D 2260/36; F05D 2260/606; F16K 11/044; F16K 11/0445

See application file for complete search history.

(56) References Cited

U.S. PATENT DOCUMENTS

| | | | |
|---|---|---|---|
| 2,931,673 A | 4/1960 | Gondek | |
| 4,470,428 A | 9/1984 | Bishop et al. | |
| 4,830,331 A | 5/1989 | Vindum | |
| 4,941,502 A | 7/1990 | Loos et al. | |
| 6,122,905 A * | 9/2000 | Liu | F04D 27/023 60/785 |
| 6,698,446 B2 | 3/2004 | Cornwell | |
| 8,272,858 B2 | 9/2012 | Bollwerk et al. | |
| 8,544,816 B2 | 10/2013 | Bielass | |
| 10,001,060 B2 | 6/2018 | Faubert et al. | |
| 10,883,616 B2 | 1/2021 | Stanhope | |

(Continued)

FOREIGN PATENT DOCUMENTS

EP 3255282 12/2017

OTHER PUBLICATIONS

European Search Report dated Nov. 3, 2023 for corresponding application No. 23175852.5.

*Primary Examiner* — Elton K Wong
(74) *Attorney, Agent, or Firm* — NORTON ROSE FULBRIGHT CANADA LLP (57) ABSTRACT

A valve for an air system in an aircraft engine, comprising: a housing defining a chamber having a valve axis; a body within the chamber about a piston axis collinear with the valve axis, extending from a first surface to a second surface, defining a bore extending from the first to the second surface, having a mating connector defined by the second surface and located radially outward of the bore relative to the piston axis; and a sleeve extending from a first end matingly engaged with the mating connector to a second end along a sleeve axis collinear with the valve axis, the first end axially stacked on the body via the first surface to define a first distance between the first end and the first surface, and via the second surface to define a second distance between the first end and the second surface greater than the first distance.

16 Claims, 8 Drawing Sheets

(56) References Cited

U.S. PATENT DOCUMENTS

| | | | |
|---|---|---|---|
| 2010/0092116 A1* | 4/2010 | Franconi | F01D 25/183 |
| | | | 384/317 |
| 2014/0234086 A1* | 8/2014 | Maliniak | F01D 17/162 |
| | | | 415/159 |
| 2015/0089939 A1* | 4/2015 | Lafiandra | F02B 39/14 |
| | | | 60/273 |
| 2016/0118777 A1* | 4/2016 | Schleif | F01D 17/06 |
| | | | 29/857 |
| 2016/0237913 A1* | 8/2016 | Marocchini | F02C 9/18 |
| 2017/0356348 A1* | 12/2017 | Ribarov | F04D 27/023 |
| 2020/0032806 A1 | 1/2020 | Franconi et al. | |
| 2021/0025400 A1 | 1/2021 | Sinico et al. | |

* cited by examiner

FIG. 1

FIG_3

FIG_6

SWITCHING VALVE

TECHNICAL FIELD

The disclosure relates generally to aircraft engines and, more particularly, to bleed air valves for such engines.

BACKGROUND

In most aircraft engines, secondary air systems employ pressurized air from the engine compressor for sealing bearing cavities, assisting in engine oil scavenging, providing internal engine cooling and cabin pressurization, among other uses. Depending on engine operation, air may be bled at different stages of the compressor for use in the secondary air system. Switching valves can be used to govern this air intake. Typically, in such valves, a spring-mounted piston is slidably received in a sleeve, and a sealing ring is used to form a seal between the piston and the sleeve. The piston may be directional as it may have an axial side provided with features that are better suited for facing toward a high-pressure side of the sleeve rather than a low-pressure side of the sleeve. Assembly of such sleeve components may pose challenges.

SUMMARY

According to an aspect of the present technology, there is provided a valve for an air system in an aircraft engine, comprising: a piston housing defining a cylindrical chamber having a valve axis; a piston body received within the chamber, the piston body extending annularly about a piston axis collinear with the valve axis, the piston body extending axially from a first axial piston surface to a second axial piston surface axially spaced apart from the first axial piston surface, the piston body defining a piston bore extending axially from the first axial piston surface to the second axial piston surface along the piston axis, the piston body having a mating connector defined by the second axial piston surface and located radially outward of the piston bore relative to the piston axis; and a sleeve extending longitudinally from a first sleeve end matingly engaged with the mating connector of the piston body to a second sleeve end along a sleeve axis collinear with the valve axis, the first sleeve end axially stacked on the piston body via the first axial piston surface to define a first distance between the first sleeve end and the first axial piston surface, and via the second axial piston surface to define a second distance between the first sleeve end and the second axial piston surface, the second distance greater than the first distance.

In another aspect, there is provided an aircraft engine comprising: a compressor including an intercompressor case defining a cylindrical chamber about a chamber axis; and a shuttle assembly received within the chamber, including: a piston body received within the chamber, the piston body extending annularly about a piston axis collinear with the valve axis, the piston body extending axially from a first axial piston surface to a second axial piston surface axially spaced apart, the piston body defining a piston bore extending axially from the first axial piston surface to the second axial piston surface about the piston axis, the piston defining a recess extending axially inwardly from the second axial piston surface and extending radially to an outer recess diameter outward of the piston bore, a junction between the first axial piston surface and the piston bore located radially inward of the outer recess diameter; a sleeve extending longitudinally from a first sleeve end to a second sleeve end, the first sleeve end sized to be received within the recess; and a shuttle having a stem extending longitudinally along a stem axis collinear with the valve axis, the shuttle having a flange projecting radially outwardly from the stem relative to the valve axis, the flange defining an axial flange surface at a first axial location of the stem, the stem defining an axial landmark at a second axial location of the stem, the piston body and the sleeve axially stacked onto the flange such that the first axial piston surface lays against the axial flange surface, the first sleeve end is received within the recess and the second sleeve end is located between the second axial piston surface and the axial landmark proximate to the axial landmark.

BRIEF DESCRIPTION OF THE DRAWINGS

Reference is now made to the accompanying figures in which.

DETAILED DESCRIPTION

Figure 1:
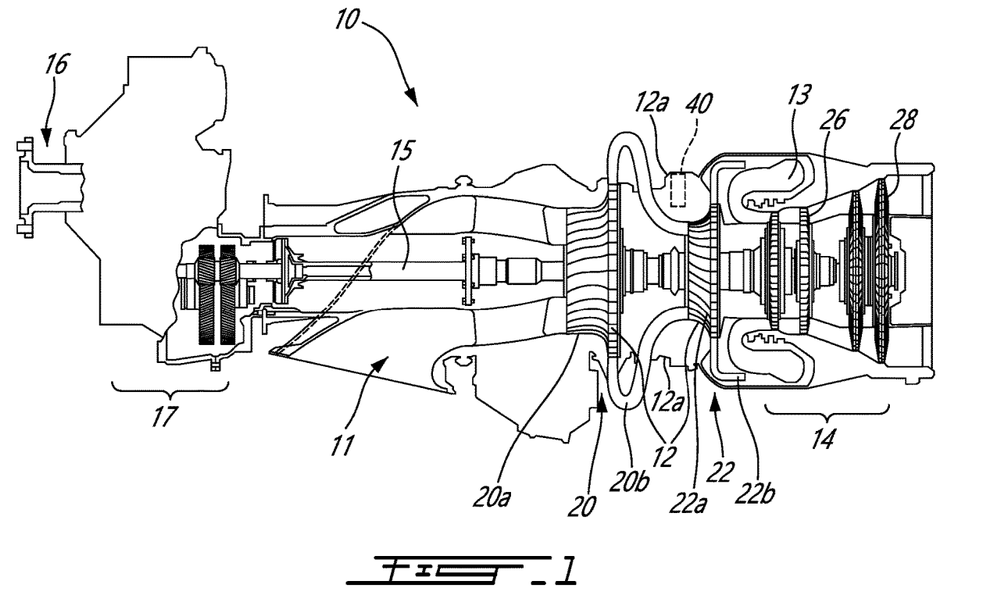
FIG. 1 is a schematic cross-sectional view of an aircraft engine.

FIG. 1 illustrates an aircraft engine 10, such as a gas turbine engine, of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The aircraft engine 10 of FIG. 1 is a turboprop engine, and therefore includes a power output shaft 15 connected to and driven by one or more of the turbines from the turbine section 14 to transmit a driving force to a propeller of the aircraft via a reduction gearbox 17 driving a propeller output flange 16. While an airborne turboprop engine 10 is shown in FIG. 1, it is to be understood that the present disclosure in general, and the switching valve described hereinbelow in particularly, may be equally applied in other types of aircraft engines, including for example turbofan, turboshaft and hybrid engines, and in some cases non-airborne applications.

In the embodiment of FIG. 1, the turbine section 14 of the aircraft engine 10 includes two sets of turbines, namely compressor turbine(s) 26 and power turbine(s) 28. The compressor turbine(s) 26 drive the compressor rotors of the compressor section 12, and are therefore mounted to a common core engine shaft 29. The power turbine(s) 28 are mounted to the power output shaft 15, which is coaxial and concentric with the core engine shaft 29, which drives the reduction gearbox 17 and ultimately the output propeller flange 16.

As can be appreciated from FIG. 1, the compressor section 12 of the aircraft engine 10 is a multi-stage compressor and includes two centrifugal compressors, namely a first, upstream, centrifugal compressor 20 and a second, downstream, centrifugal compressor 22. The upstream centrifugal compressor 20 will be referred to herein as the low pressure (LP) compressor 20, and the downstream centrifugal compressor 22 will be referred to herein as the high pressure (HP) compressor 22. These two compressors 20 and 22 are disposed adjacent to one another and in succession within a main flow path of the engine 10 of the compressor section 12, such that they are in serial flow communication without any intervening compressor stages (e.g. axial compressors) therebetween. A primary airflow occurring in the main flow path of the engine 10 is drawn into the intake 11, directed into the LP compressor 20 for compression, directed into the HP compressor 22 for further compression, and directed into the combustor 13 for combustion.

Each of the compressors 20, 22 includes an impeller and a diffuser downstream therefrom. Although vane diffusers may also be used, in the depicted embodiment both of the compressors 20 and 22 employ diffuser pipes downstream from their respective impellers. More particularly, the LP compressor 20 includes an LP impeller 20a and LP diffuser pipes 20b which receive the compressed air exiting the LP impeller 20a. The HP compressor 22 includes an HP impeller 22a and HP diffuser pipes 22b which receive the compressed air exiting the HP impeller 22a and direct it to the combustor 13 downstream. The compressor section 12 also includes an intercompressor case 12a located axially between the impellers 20a, 22a of the LP and HP compressors 20, 22.

Secondary airflows also occur in the engine 10, and are bled, or taken, from suitable locations of the main flow path in order to provide suitable pressure or cooling to engine components located remotely from the main flow path. For instance, pressurized air may be bled from various sources, for example the low pressure compressor 20 and/or the high pressure compressor 22, to seal bearing cavities, to assist oil scavenging, to cool the engine 10, and to drive aircraft systems such as aircraft pneumatic, air conditioning, and/or de-icing systems, to name a few. Bleed air may be routed to a desired location via flow path(s) defined by suitable pneumatic means including air line(s), passage(s), tube(s) and valve(s) such as an air switching valve 40, referred to henceforth as the valve 40. In embodiments, the valve 40 is connected to the intercompressor case 12a, and is adapted to govern whether air provided downstream of the valve 40 is taken from the LP compressor 20 or the HP compressor 22.

Figure 2:
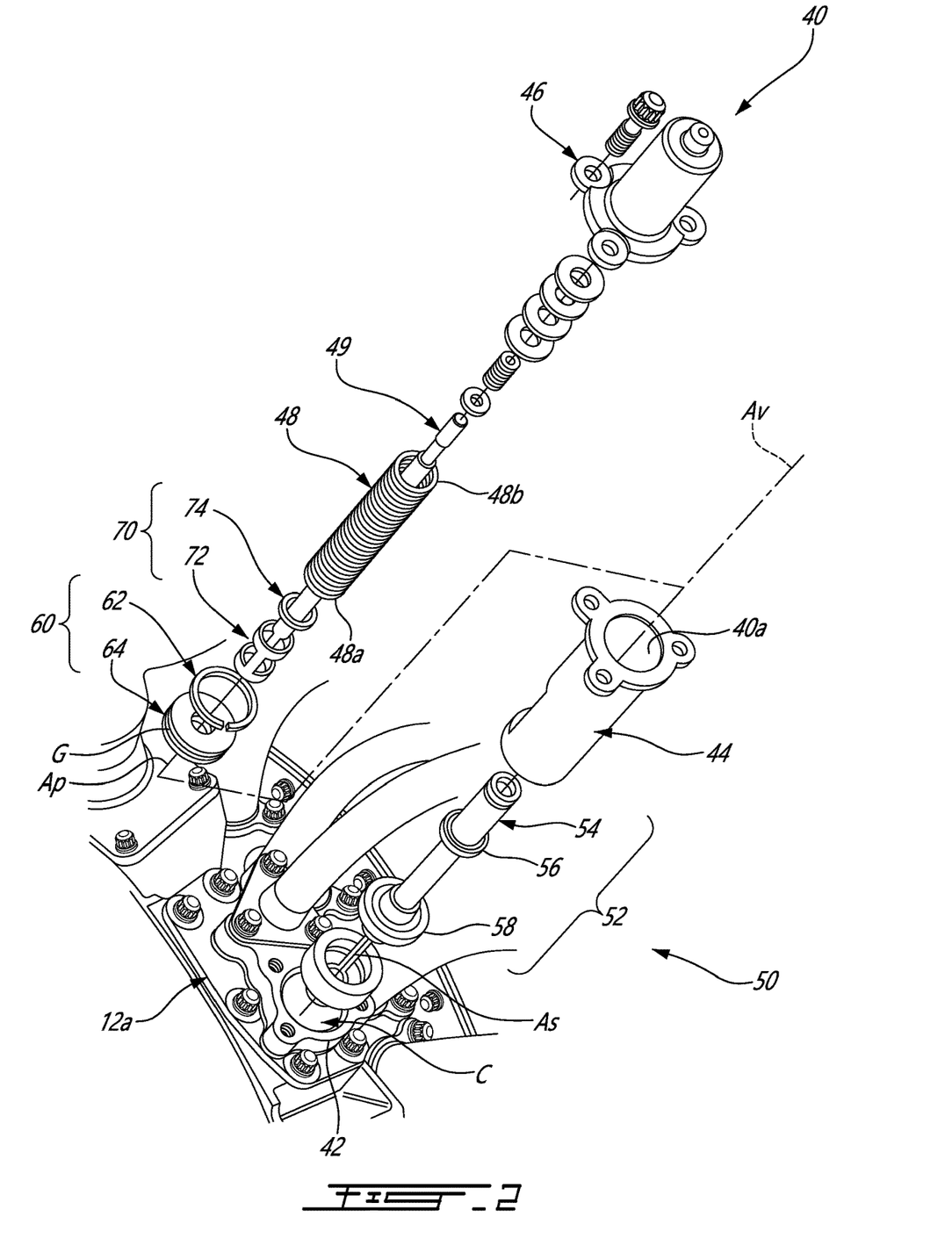
FIG. 2 is an exploded view of a valve of the aircraft engine of FIG. 1.
Figure 3:
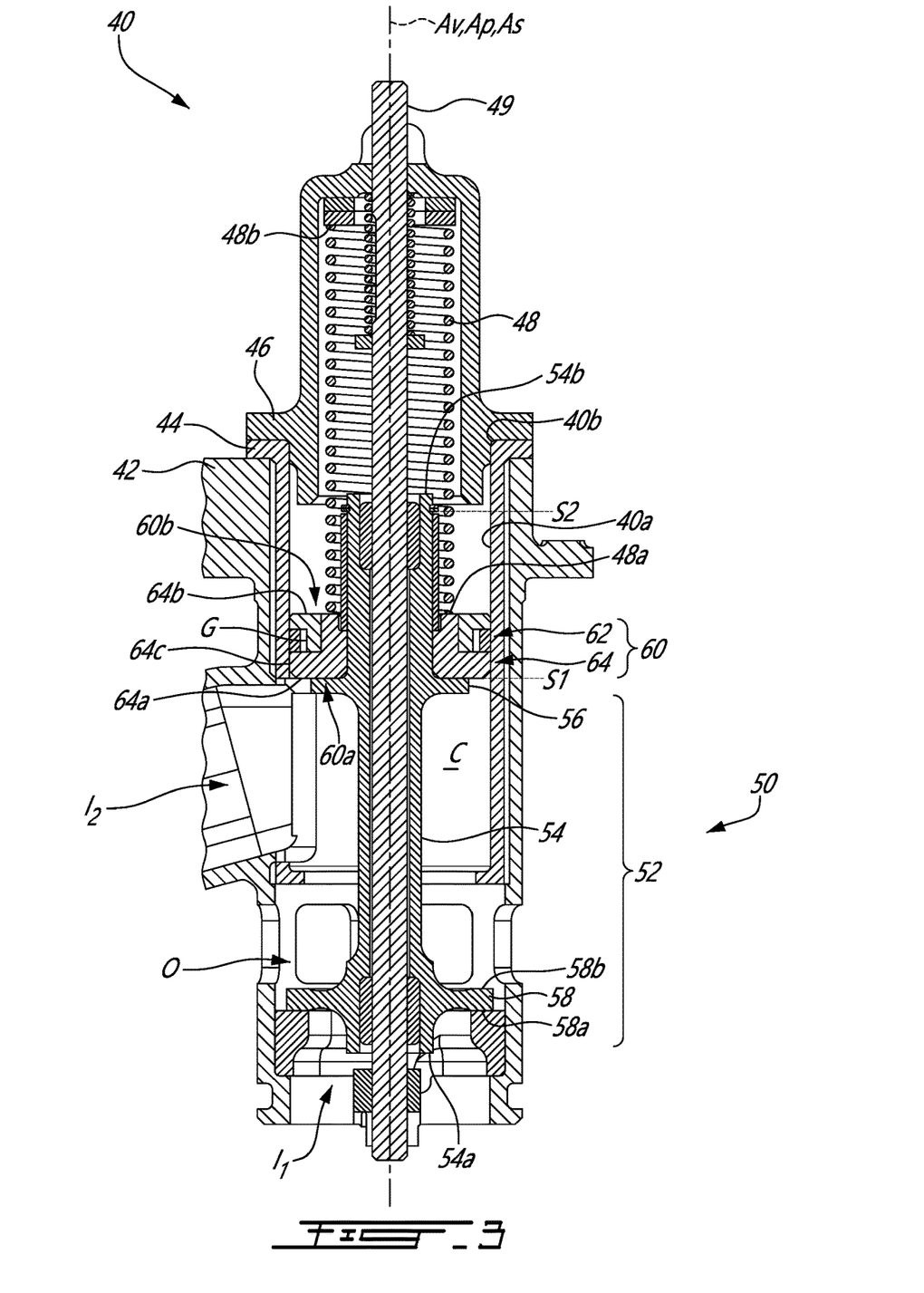
FIG. 3 is a cross-sectional view of the valve of FIG. 2.

Referring to FIGS. 2 and 3, the valve 40 will now be generally described. The valve 40 includes a hollow outer housing 42 defining a cylindrical chamber C, or sleeve, about a valve axis $A_V$ (also referred to as a chamber axis). The outer housing 42 defines a first inlet $I_1$ in fluid communication with the HP compressor 22, a second inlet $I_2$ in fluid communication with the LP compressor 20, and an outlet O (FIG. 3) respectively in fluid communication with the chamber C. The first inlet $I_1$, the second inlet $I_2$, and the outlet O are openings that are located at an end of the chamber C that may be referred to as an open end.

The outer housing 42 is in this embodiment integral to the intercompressor case 12a, although the outer housing 42 may be a distinct part assembled to a case or other engine structure in some embodiments. The valve 40 may also include an inner housing 44 received by the outer housing 42 so as to line the chamber C. Here, a cylindrical valve sealing surface 40a of the valve 40 corresponds to a radially inner surface of the inner housing 44. In some embodiments, the inner housing 44 is omitted, in which case the valve sealing surface 40a corresponds to a radially inner surface of the outer housing 42. The valve sealing surface 40a defines a sealing diameter circumscribing the chamber C. The valve 40 also includes a hollow cover 46 connected to the outer housing 42 (in this case via a flange of the inner housing 44) about the valve axis $A_V$ so as to define a closed end of the chamber C spaced axially from the open end relative to the valve axis $A_V$. A spring 48 of the valve 40 extends along the valve axis $A_V$ inside the chamber C and from a first spring end 48a to an opposite, second spring end 48b lodged inside the cover 46. A shuttle assembly 50 of the valve 40 is received in the chamber C and extends along the valve axis $A_V$, engaging the spring 48 at the first spring end 48a. A guide pin 49 of the valve 40 extends along the valve axis $A_V$ between a first pin end held by the outer housing 42 at a bottom of the chamber C and a second pin end held by the cover 46. The housing 42, 44 (in this case the inner housing 44) defines an assembly opening 40b of the valve 40 via which, absent the cover 46, the shuttle assembly 50, the spring 48 and the guide pin 49 are receivable within the chamber C. The guide pin 49 extends through the shuttle assembly 50 in sliding engagement therewith, rendering the shuttle assembly 50 slidably movable along the valve axis $A_V$ inside the chamber C. The shuttle assembly 50 is movable in the chamber C along the valve axis $A_V$ between a first shuttle position and a second shuttle position. In the first shuttle position, the shuttle assembly 50 obstructs the first inlet $I_1$ and fluid communication between the second inlet $I_2$ and the outlet O via the chamber C is open, i.e., unhindered by the shuttle assembly 50. In the second shuttle position, the shuttle assembly 50 obstructs the second inlet $I_2$ and fluid communication between the first inlet $I_1$ and the outlet O via the chamber C is open, i.e., unhindered by the shuttle assembly 50. The shuttle assembly 50 is operatively connected to the spring 48 to be biased by the spring 48 toward the first shuttle position.

During initial start-up of the engine 10, air from the HP compressor 22 may be the only pressurized air available, in which case the shuttle assembly 50 is in the second shuttle position. HP compressor 22 air flows, for example via a transfer tube, through the housing 42 and into the chamber C via the first inlet $I_1$ and overcomes the biasing force of the spring 48. From the chamber C, the air exits via the outlet O, passes through a cavity in the intercompressor case 12a, to be supplied to its destination via suitable external lines. As the LP compressor 20 pressure increases (NH<40-45%), it works with the biasing force of the spring 48 to move the shuttle assembly 50 to the first shuttle position, thereby interrupting the flow of HP compressor 22 air via the outlet O and replacing it with a flow of LP compressor 20 air. Generally stated, the valve 40 acts as a switch between air sources (hence the expression "switching valve") governing from which source the air is to be bled depending on the operation regime of the engine 10.

Referring to FIG. 3, the shuttle assembly 50 includes a shuttle 52 having a stem 54 extending longitudinally along a stem axis $A_S$ from a first stem end 54a to a second stem end 54b. The shuttle 52 also has a flange 56 projecting radially outwardly from the stem 54 at a first axial location S1 of the stem 54 between the first and second stem ends 54a, 54b. At a second axial location S2 of the stem 54 proximate to the second stem end 54b, the shuttle 52 has an axial landmark defined by the stem 54. The first and second axial locations S1, S2 of the stem 54 represent opposite boundaries of an axial volume inside which stackable components 60, 70 of the shuttle assembly 50 are to be stacked during assembly of the valve 40. As will be explained hereinbelow, during the assembly of the valve 40, the axial landmark of the shuttle 52 may be indicative of whether one or more of the stackable components 60, 70 has been stacked onto the flange in a suitable orientation. The shuttle 52 also has a blocking feature 58 located proximate to the first stem end 54a and spaced axially relative to the flange 56. The blocking feature 58 is shaped complementarily to an inner wall of the valve 40 defining the chamber C to cooperate therewith such that fluid communication between the first inlet $I_1$ or the second inlet $I_2$ and the chamber C is blocked depending on the position of the shuttle assembly 50. In the depicted embodiment, the blocking feature 58 has a flange-like shape projecting radially outwardly from the stem 54, having a first sealing surface 58a, for example an axial surface, for sealing the first inlet $I_1$, and a second sealing surface 58b, for example an axial surface, for sealing the second inlet $I_2$.

Among the stackable components 60, 70, the shuttle assembly 50 includes a piston assembly 60 extending about a piston axis $A_P$. The piston assembly 60 is received within the chamber C such that the piston axis $A_P$ and the valve axis $A_V$ are collinear. During assembly of the valve 40, the piston assembly 60 stacks onto the flange 56 and the spring 48 subsequently stacks onto the piston assembly 60. The piston assembly 60 has opposite axial sides, namely a high-pressure side 60a laid against the flange 56 and a low-pressure side 60b laid against the spring 48. The shuttle assembly 50 thus engages the spring 48 via the low-pressure side 60b of the piston assembly 60.

Figure 4:
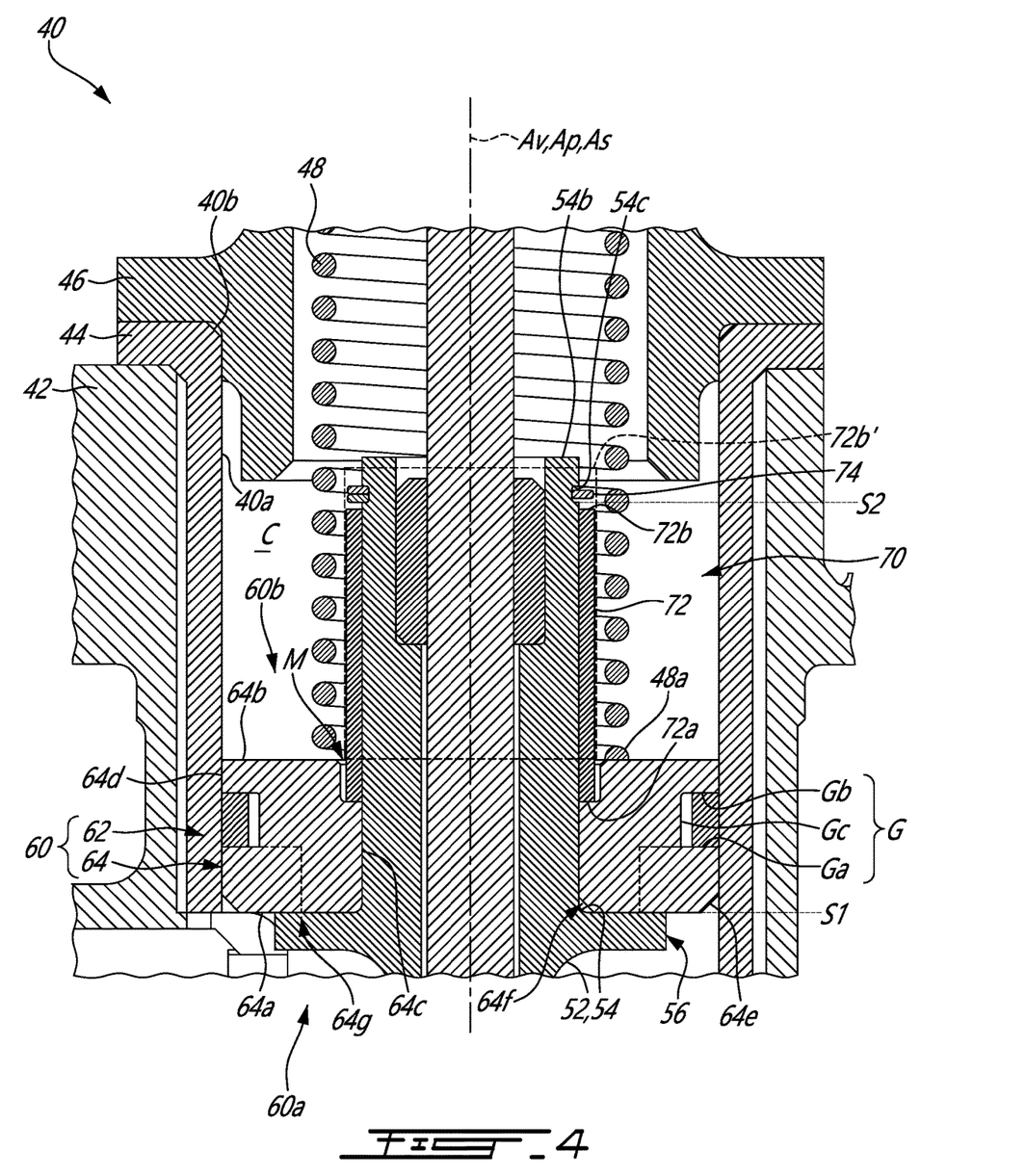
FIG. 4 is a partial cross-sectional view of the valve of FIG. 2 according to embodiments.
Figure 5:
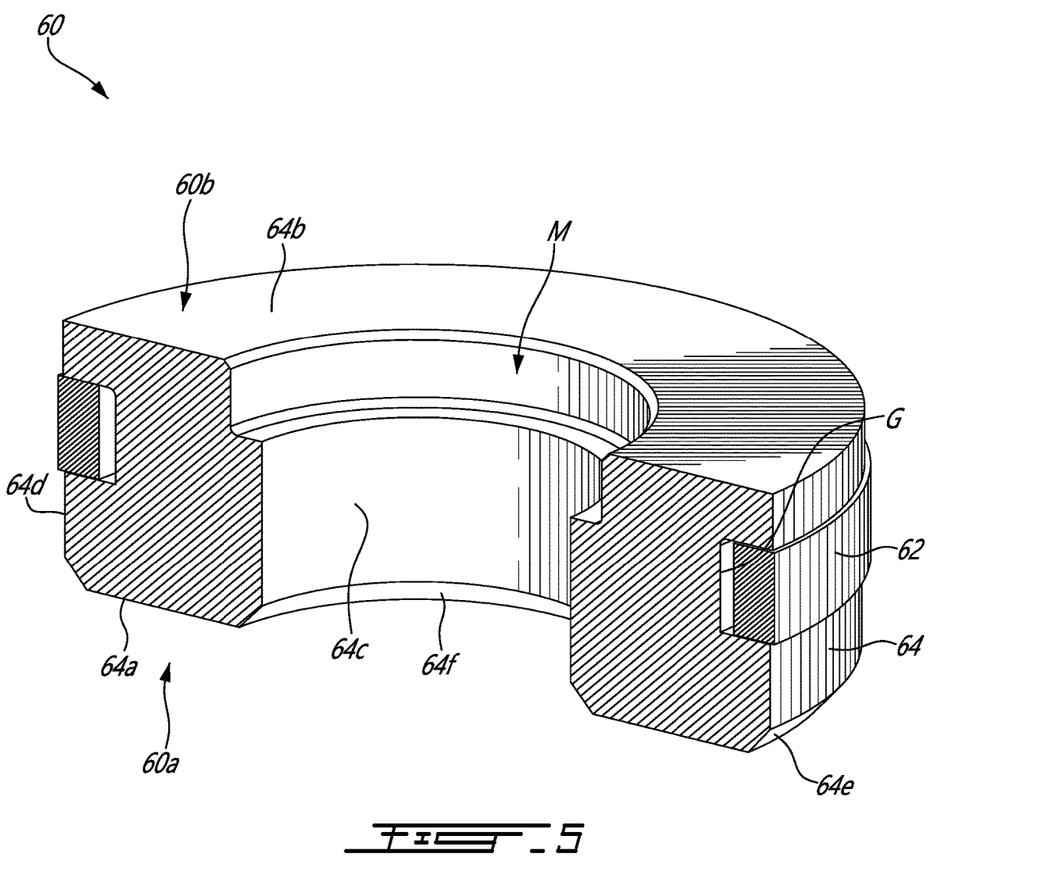
FIG. 5 is a perspective, cross-sectional view of a piston assembly of the valve of FIG. 2 according to embodiments.

Referring to FIGS. 4 and 5, the piston assembly 60 generally includes a sealing ring 62 and a disc-like piston body 64 surrounded by the sealing ring 62. As will be described hereinbelow, the piston body 64 defines an annular groove G into which the sealing ring 62 is lodged to be axially constrained, or held. The sealing ring 62 includes opposite first and second axial ring surfaces 62a, 62b, and radially inner and outer ring surfaces 62c, 62d extending axially therebetween. As best seen in FIG. 2, the sealing ring 62 is of the split ring type, which may facilitate radial contraction and/or expansion of the sealing ring 62. In the depicted embodiments, the sealing ring 62 has ends that are circumferentially spaced from one another and that have cross sections similar to a remainder of the sealing ring 62, defining a gap via which the sealing ring 62 may be traversed radially and axially. In other embodiments, the ends may instead define one or more tabs that overlap one another, defining a chicane, or non-linear path, in the axial direction from the first axial ring surface 62a to the second axial ring surface 62b. It is contemplated however that in some embodiments, the sealing ring 62 could be closed, i.e., uninterrupted. The sealing ring 62 may be constructed of a variety of suitable materials suitable for achieving its sealing function, including one or more of metal, carbon, etc.

The piston body 64 has opposite first and second axial piston surfaces 64a, 64b, and radially inner and outer piston surfaces 64c, 64d extending axially therebetween. The radially inner piston surface 64c may also be referred to as a piston bore having an inner piston diameter of the piston body 64. The radially outer piston surface 64d has an outer piston diameter of the piston body 64 that is greater than the inner piston diameter yet smaller than the sealing diameter. As mentioned above, the piston body 64 defines an annular groove G, which extends radially inwardly from the radially outer piston surface 64d. The annular groove G (hereinafter the groove G) is sized for receiving the sealing ring 62. Indeed, the sealing ring 62 extends radially inwardly relative to the piston axis $A_P$ from outside the groove G (i.e., outward of the outer piston diameter) to inside the groove G (i.e., inward of the outer piston diameter). The groove G has first and second groove walls Ga, Gb facing one another, and a groove bottom Gc extending axially between the first and second groove walls Ga, Gb (FIG. 4). In embodiments, the groove G is sized such that a radial gap is formed between the groove bottom Gc and the radially inner ring surface 62c. This radial gap may allow radial contraction of the sealing ring 62 unhindered by the piston body 64. For example, the sealing ring 62 may have an outer diameter that is greater than the sealing diameter of the chamber C and, in order to fit the sealing ring 62 into the chamber C, the sealing ring 62 may be radially contracted, bringing the radially inner ring surface 62c closer to the groove bottom Gc. Such radial contraction may be facilitated by the split configuration of the sealing ring 62. Moreover, such radial contraction may advantageously bias the radially outer ring surface 62d against the valve sealing surface 40a. When the piston assembly 60 is received inside the chamber C, the radially outer ring surface 62d is in radial engagement with the valve sealing surface 40a, thereby forming an axial seal partitioning the chamber C into high-pressure and low-pressure portions on either side of the sealing ring 62.

A height of the groove G (i.e., a distance between the first and second groove walls Ga, Gb) may generally correspond to a height of the sealing ring 62 (i.e., a distance between the first and second axial ring surfaces 62a, 62b). In embodiments, the groove G is sized such that the sealing ring 62 is axially loose relative to the piston body 64 (i.e., the height of the sealing ring 62 is less than that of the groove G). However, in such cases, as pressure is greater on the high-pressure side 60a than on the low-pressure side 60b of the piston assembly 60 (and hence of the sealing ring 62), the second axial ring surface 62b is biased against the second axial wall Gb of the groove G, thereby forming a radial seal preventing, or at least hindering, circumvention of the axial seal by fluid circulating in the chamber C.

Among the stackable components 60, 70, the shuttle assembly 50 includes at least one axial component 70 disposed about the piston axis $A_P$ spaced from the flange 56 by the piston assembly 60 relative to the piston axis $A_P$. Such axial component 70 may be used to space the piston assembly 60 from the second stem end 54b relative to the stem axis $A_S$, for example to hold the piston assembly 60 against the flange 56. Hence, during assembly of the valve 40, such axial component 70 is installed onto the shuttle 52 subsequently to the stacking of the piston assembly 60 onto the flange 56 of the shuttle 52, and ideally prior to the stacking of the spring 48 onto the piston assembly 60. The at least one axial component 70 may for example include a tubular sleeve 72 (hereinafter the sleeve 72). The sleeve 72 extends longitudinally along a sleeve axis (not shown) from a first sleeve end 72a to a second sleeve end 72b opposite to the first sleeve end 72a. The first sleeve end 72a matingly engages the low-pressure side 60b of the piston assembly 60 upon stacking thereon with the sleeve axis being collinear with the piston axis $A_P$, as will be described hereinbelow. It is contemplated that the sleeve 72 may include a plurality of sleeve portions, for example a first sleeve portion having the first sleeve end 72a and a second sleeve portion having the second sleeve end 72b. Axial movement of the sleeve 72 relative to the stem axis $A_S$ is bound at the first sleeve end

72a by the piston assembly 60, and at the second sleeve end 72b for example by another axial component 70 such as a fastener 74, among other possibilities. The fastener 74, also referred to as a shuttle fastener 74, may be a retaining ring, as shown lodged in an annular groove 54c of the stem 54 (hereinafter the stem groove 54c) defining the second axial location S2. In some embodiments, the fastener 74 may instead be a nut threadedly engaged with the stem 54 at the second stem end 54b. The shuttle fastener 74 is engageable with the shuttle 52 at the axial landmark to secure the sleeve 72 onto the shuttle 52 between the flange 56 and the shuttle fastener 74. In the depicted embodiment, the stem groove 54c corresponds to the axial landmark of the shuttle 52. The second axial location S2 of the stem 54 is spaced away from the second stem end 54b, although it is contemplated that in other embodiments, the second axial location S2, and hence the axial landmark of the shuttle 52, may be defined by the second stem end 54b.

With reference to FIGS. 4 to 8, details pertaining to the assembly of the valve 40 will now be provided. The piston assembly 60 may be said directional as it has an axial side, namely the high-pressure side 60a, which presents features that are suited for facing toward the high-pressure side of the valve 40, i.e., toward the flange 56 and the inlets $I_1$, $I_2$ of the valve 40. Conversely, the low-pressure side 60b may lack such features and/or present features that are ill-suited for facing toward the high-pressure side of the valve 40. For example, the high-pressure side 60a may present a suitable outer transition surface 64e extending from the first axial piston surface 64a to the radially outer piston surface 64d, such as a bevel (as shown) or a radius. This outer transition surface 64e may for instance serve alignment purposes, as it may lead the piston assembly 60 radially inward of the access opening 40b as the piston assembly 60 is installed into the chamber C. The high-pressure side 60a may also present an inner transition surface 64f extending from the first axial piston surface 64a to the radially inner piston surface 64c, such as a bevel (as shown), a radius or another suitable surface defining a recess, or clearance, extending radially outwardly from the inner piston diameter. This inner transition surface 64f may be sized for receiving a radius at the junction between the stem 54 and the flange 56, allowing the seating of the first axial piston surface 64a onto the flange 56 as the piston assembly 60 is stacked onto the shuttle 52. In embodiments, the inner transition surface 64f may be referred to as a first recess 64f of the piston body 64 defined axially inwardly from the first axial piston surface 64a. The high-pressure side 60a may also present a discontinuity 64g in the first axial piston surface 64a, for example a junction between first and second components of the piston body 64 having been assembled together. The discontinuity 64g may be at a radial location relative to the stem axis $A_S$ between the inner piston diameter and an outer flange diameter circumscribing the flange 56. This discontinuity 64g may advantageously be laid onto the flange 56, which may shield the discontinuity 64g from the high-pressure environment occurring the valve 40 and thus assist in preventing unwanted disassembly of the piston body 64.

In accordance with the present technology, to limit occurrences of mis-orientation of the piston assembly 60 inside the chamber C during assembly of the valve 40, the piston assembly 60 is structured to abut the axial component 70 when the latter is stacked thereon in collinear alignment therewith so as to define different heights depending on which side 60a, 60b of the piston assembly 60 lays against the flange 56 and, conversely, which side 60a, 60b engages with the axial component 70. The stackable components 60, 70 define a first stacking height when the axial component engages the low-pressure side 60b with the high-pressure side 60a engaging the flange 56, and a second stacking height greater than the first stacking height when the second axial piston surface 64b engages the high-pressure side 60a with the low-pressure side 60b engaging the flange 56. A difference between the first and second stacking heights is a result of the piston body 64 being suitably sized, on either side 60a, 60b, with respect to the first sleeve end 72a. In either case, as the stackable components 60, 70 extend heightwise from the flange 56 to proximate the access opening 40b of the valve 40, a worker inspecting the stem assembly 50 via the access opening 40b may readily verify whether the height defined by the stackable components 60, 70 corresponds to the first or the second stacking height by inspecting the location of the second sleeve end 72b relative to the axial landmark. In some embodiments, the first stacking height extends from the first axial location S1 of the stem 54 to proximate (albeit short of) the second axial location S2 of the stem 54 (for example as shown by the location of the second sleeve end 72b in FIG. 4), whereas the second stacking height extends from the first axial location S1 to at least the second axial location S2 (for example as schematically shown at 72b' in FIG. 4). In some such embodiments, the stackable components 60, 70 extending to at least the second axial location S2 prevents the worker from completing the assembly of the valve 40 as installation of the fastener 74 at the second axial location S2 is hindered by the axial component 70, for example the sleeve 72 axially overlaying the stem groove 54c.

Referring to FIGS. 4 and 5, on the low-pressure side 60b, the piston body 64 has a mating connector M defined by the second axial piston surface 64b and located radially outward of the piston bore, onto which the axial component 70 may be stacked. A shape of the mating connector M is complementary to that of the first sleeve end 72a, such that the first sleeve end 72a is matingly engageable with the mating connector M past the second axial piston surface 64b up to a certain engagement depth, or second distance, upon the sleeve 72 being stacked onto the piston body 64 on the low-pressure side 60b. In some embodiments, the second distance corresponds to the difference between the first and second stacking heights. In the depicted embodiment, the mating connector M is provided in the form of a recess extending axially inwardly from the second axial piston surface 64b relative to the piston axis $A_P$. The recess may also be adjacent to the piston bore (as shown) or spaced radially outwardly therefrom relative to the piston axis $A_P$. The recess (which may also be referred to as a second recess of the piston body 64, for example when the first recess 64f is present) is circumscribed radially outwardly relative to the piston axis $A_P$ by an outer recess diameter greater than the inner piston diameter. For embodiments in which the mating connector M is the recess, the first sleeve end 72a may thus be sized to be receivable within the recess, and the recess may be said to be sized to receive the first sleeve end 72a. As shown in the depicted embodiment, the recess may be annular in shape, although other shapes are contemplated.

On the high-pressure side 60a, the piston body 64 may be substantially flat, having for example the first axial piston surface 64a extending radially between the outer and inner transition surfaces 64e, 64f, and the first sleeve end 72a may engage with a flat portion of the piston body 64 corresponding to the first axial piston surface 64a or to another surface of the piston body 64 coplanar with the first axial piston surface 64a. In the depicted embodiment, an outermost diameter of the sleeve 72 at the first sleeve end 72a corresponds to at least an outermost diameter of the inner transition surface 64f defined by the first axial piston surface 64a. Nevertheless, in some embodiments, the high-pressure side 60a may present features allowing the first sleeve end 72a to matingly engage therewith past the first axial piston surface 64a up to a certain engagement depth, or first distance. However, the piston body 64 and the sleeve 72 are structured and arranged relative to one another such that should there be any mating engagement possible between the piston body 64 and the first sleeve end 72a on the high-pressure side 60a, the second distance is greater than the first distance, i.e., a mating engagement of the first sleeve end 72a via the low-pressure side 60b of the piston assembly 60 is greater than any mating engagement of the first sleeve end 72a via the high-pressure side 60a. Stated otherwise, the first sleeve end 72a is axially stackable on the piston body 64 via the first axial piston surface 64a to define the first distance between the first sleeve end 72a and the first axial piston surface 64a, and via the second axial piston surface 64b to define the second distance between the first sleeve end 72a and the second axial piston surface 64b. The second distance is greater than the first distance. The first distance may be null.

Figure 6:
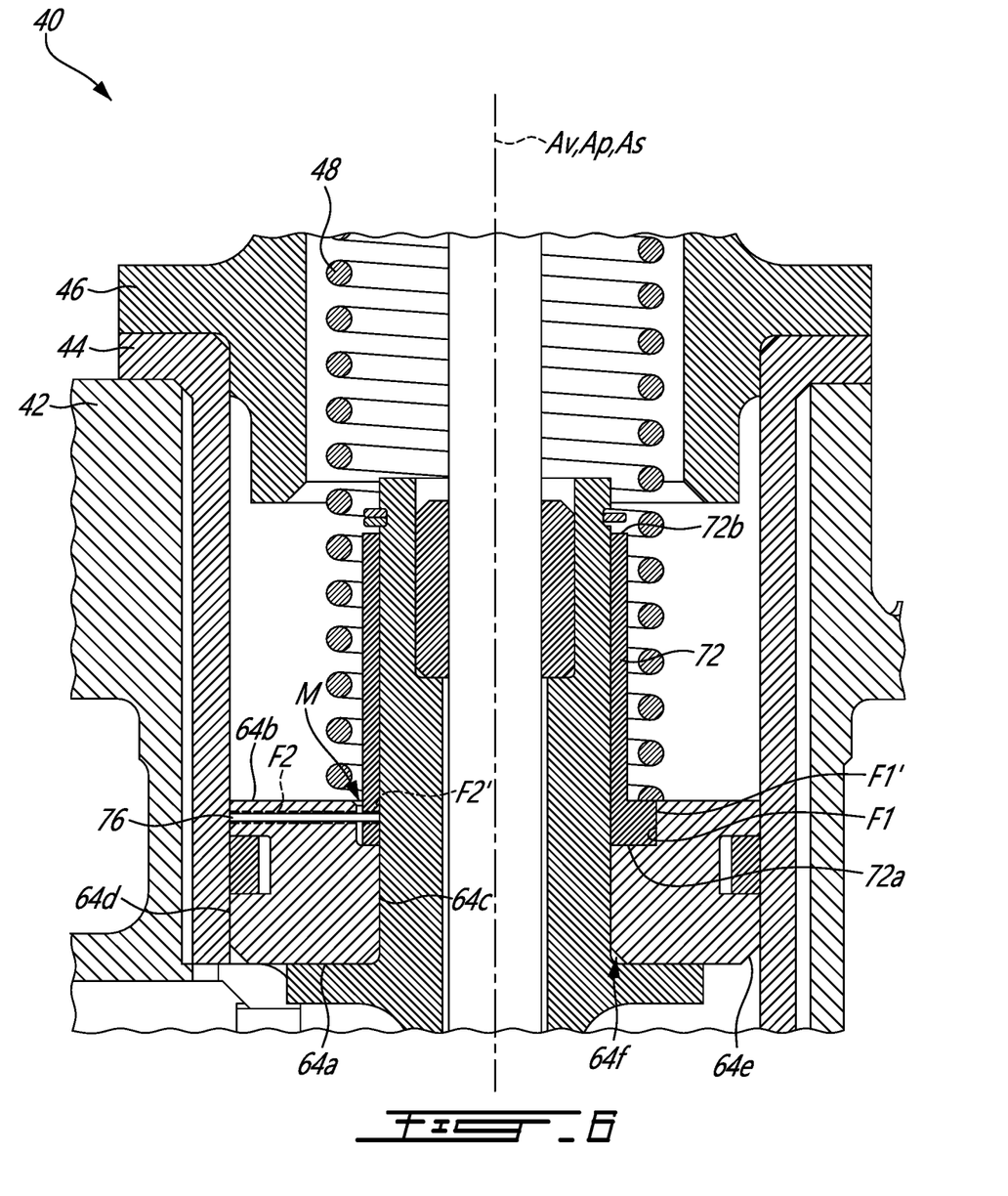
FIG. 6 is a partial cross-sectional view of the valve of FIG. 2 according to embodiments.

Turning now to FIG. 6, the stackable components 60, 70 may be provided with further features that may assist the worker to determine in which orientation one or more of the stackable components 60, 70 must be to be suitably stacked. For example, in embodiments, the mating connector M and the first sleeve end 72a may have complementary non-annular shapes F1, F1' defining antirotational features cooperable to hinder rotation of the piston body 64 and the sleeve 72 relative to one another about the valve axis $A_V$. In one contemplated implementation, the mating connector M has an annular portion and a keyway F1 extending radially outwardly from the annular portion relative to the piston axis $A_P$. Conversely, the first sleeve end 72a has an annular portion and a key-like protrusion F1' projecting radially outwardly from the annular portion relative to the sleeve axis. In embodiments, the piston body 64 and the sleeve 72 respectively define a first keyway F2 and a second keyway F2' arranged to be in register with one another upon the first sleeve end 72a being stacked onto the low-pressure side 60b in a suitable orientation about the piston axis $A_P$. The first keyway F2 may be in communication with the mating component M. The second keyway F2' is located proximate to the first sleeve end 72a. A sleeve fastener 76, in this case a pin, may extend from inside the first keyway F2 to inside the second keyway F2'. The sleeve fastener 76, by being so engaged with both the piston body 64 and the sleeve 72, hinders axial movement of the piston body 64 and the sleeve 72 relative to one another along the valve axis $A_V$. In embodiments, the first sleeve end 72a and the mating connector M are respectively threaded and tapped (or vice versa) complementarily so that they may be threadedly engaged with one another.

Figure 7:
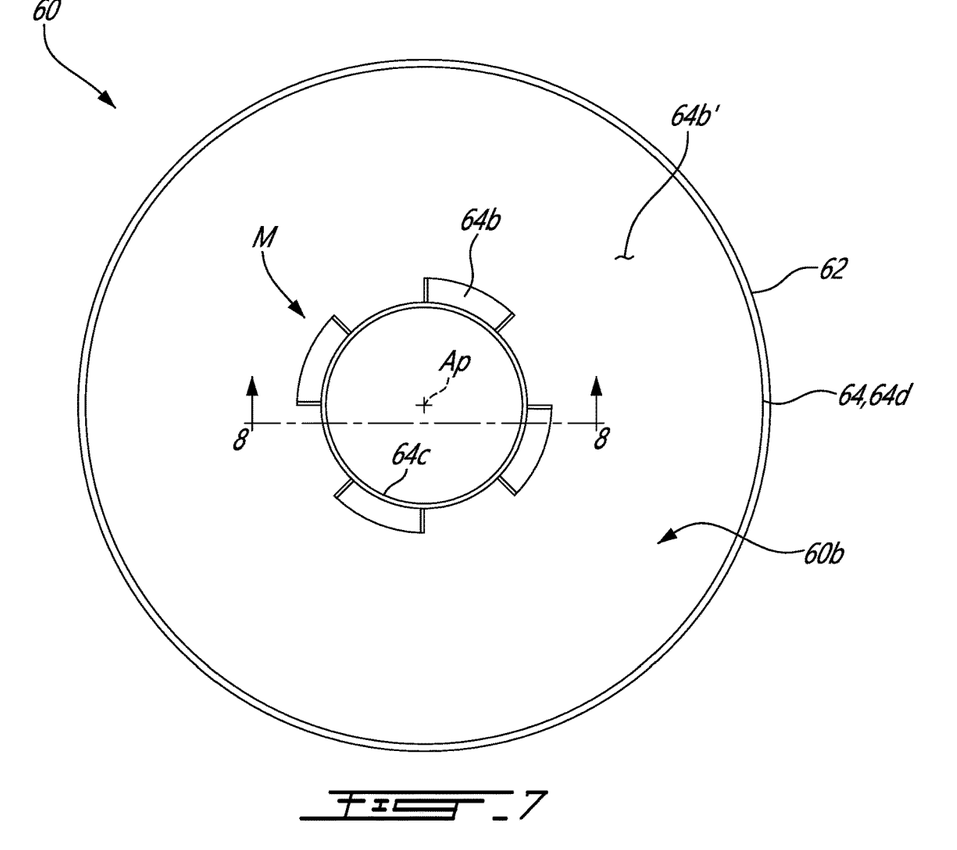
FIG. 7 is a planar view of a piston assembly of the valve of FIG. 2 according to embodiments.
Figure 8:
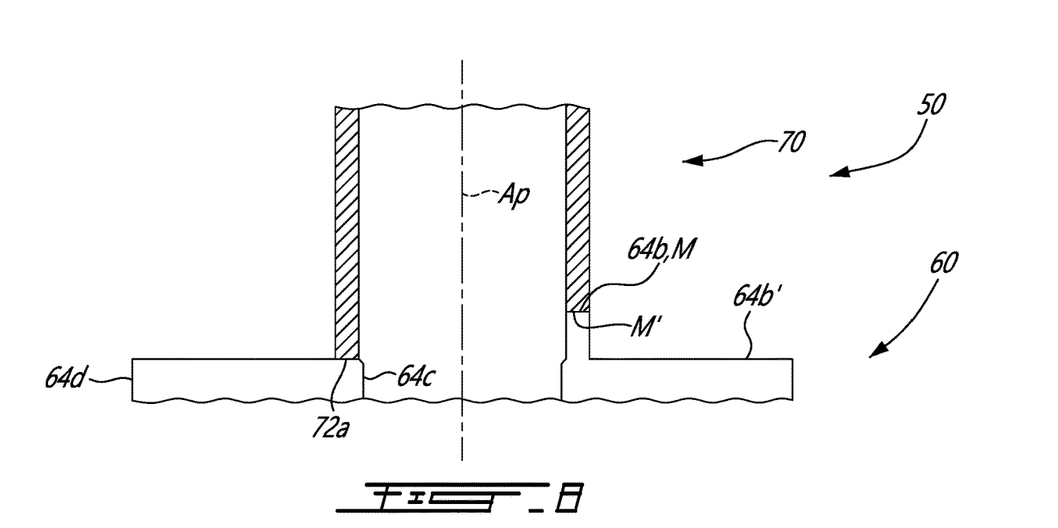
FIG. 8 is a partial cross-sectional view of the piston assembly of FIG. 7 taken along the line 8-8 of FIG. 7, the piston assembly shown stacked with an axial component of the valve.

Referring to FIGS. 7 and 8, another exemplary embodiment of the valve 40 will now be described. In this embodiment, the mating component M is provided in the form of a crenelated ridge extending circumferentially around the piston axis $A_P$ radially outward of the piston bore. The mating component M includes a plurality of axial projections that are circumferentially spaced from one another and that extend axially from an axial surface 64b' that is recessed relative to the second axial piston surface 64b to their respective ends which define the second axial piston surface 64b. In some embodiments, the projections may extend by different heights, in which case an end of a tallest one of the projections defines the second axial piston surface 64b. The first sleeve end 72a has a crenelated shape M' complementary to that of the mating component M.

Figure 9:
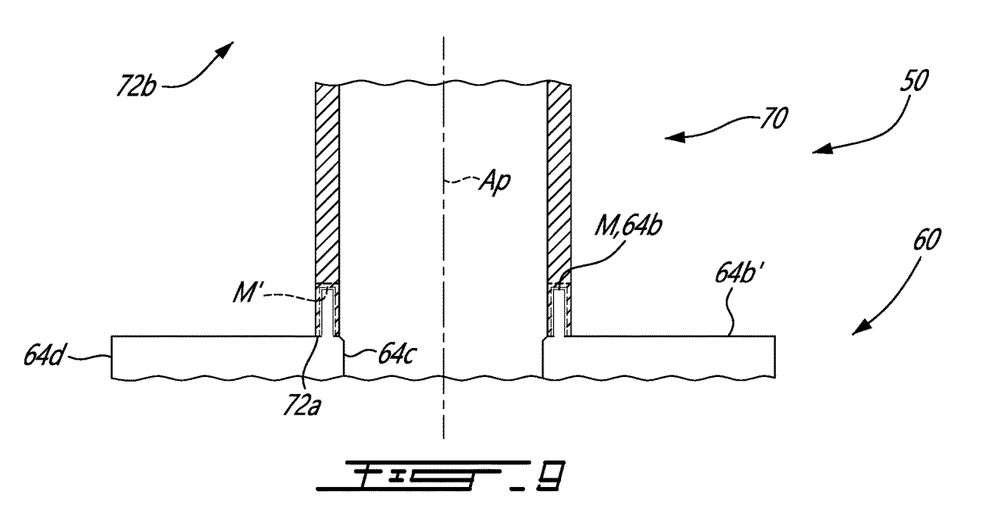
FIG. 9 is a partial cross-sectional view of a piston assembly of the valve of FIG. 2 according to embodiments.

Referring to FIG. 9, yet another exemplary embodiment of the valve 40 will now be described. In this embodiment, the mating component M is provided in the form of an annular ridge extending circumferentially around the piston axis $A_P$ radially outward of the piston bore. The mating component M extends axially from an axial surface 64b' that is recessed relative to the second axial piston surface 64b to an end which defines the second axial piston surface 64b. The first sleeve end 72a has a shape M' complementary to that of the mating component M, in this case an annular groove extending circumferentially around the sleeve axis and axially from the first sleeve end 72a toward the second sleeve end 72b.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, embodiments of the present technology have been described hereinabove as implemented in an aircraft engine switching valve having a housing integral with an intercompressor case of the aircraft engine. It is contemplated however that the present technology may be implemented in other types of valve. Yet further modifications could be implemented by a person of ordinary skill in the art in view of the present disclosure, which modifications would be within the scope of the present technology.

The invention claimed is:

1. A valve for an air system in an aircraft engine, comprising:
   a piston housing defining a cylindrical chamber having a valve axis;
   a piston body received within the chamber, the piston body extending annularly about a piston axis collinear with the valve axis, the piston body extending axially from a first axial piston surface to a second axial piston surface axially spaced apart from the first axial piston surface, the piston body defining a piston bore extending axially from the first axial piston surface to the second axial piston surface along the piston axis, the piston body defining a recess extending axially inwardly from the second axial piston surface and extending radially to an outer recess diameter outward of the piston bore, a junction between the first axial piston surface and the piston bore located radially inward of the outer recess diameter;
   a sleeve extending longitudinally from a first sleeve end to a second sleeve end along a sleeve axis collinear with the valve axis, the first sleeve end sized to be received within the recess; and
   a shuttle having a stem extending longitudinally along a stem axis collinear with the valve axis, the shuttle having a flange projecting radially outwardly from the stem relative to the valve axis, the flange defining an axial flange surface at a first axial location of the stem, the stem defining an axial landmark at a second axial location of the stem, the piston body and the sleeve axially stacked onto the flange such that the first axial piston surface lays against the axial flange surface, the first sleeve end is received within the recess and the second sleeve end is located between the second axial piston surface and the axial landmark at the second axial location of the stem.

2. The valve of claim 1, further comprising a shuttle fastener engageable with the shuttle at the axial landmark to secure the sleeve between the flange and the shuttle fastener.

3. The valve of claim 1, wherein the axial landmark is an annular groove extending circumferentially around the stem axis.

4. The valve of claim 1, wherein the second axial piston surface and the first sleeve end respectively define complementary anti-rotational features that cooperate to hinder rotation of the piston body and the sleeve relative to one another about the valve axis.

5. The valve of claim 1, further comprising a sleeve fastener engaged with the piston body and the sleeve to hinder axial movement of the piston body and the sleeve relative to one another along the valve axis.

6. The valve of claim 1, wherein the recess is annular in shape.

7. The valve of claim 1, wherein the second axial piston surface includes at least one axial projection, the first sleeve end defining a shape complementary to that of the at least one axial projection.

8. An aircraft engine comprising:
a compressor including an intercompressor case defining a cylindrical chamber about a chamber axis; and
a shuttle assembly received within the chamber, including:
a piston body received within the chamber, the piston body extending annularly about a piston axis collinear with the chamber axis, the piston body extending axially from a first axial piston surface to a second axial piston surface axially spaced apart, the piston body defining a piston bore extending axially from the first axial piston surface to the second axial piston surface about the piston axis, the piston defining a recess extending axially inwardly from the second axial piston surface and extending radially to an outer recess diameter outward of the piston bore, a junction between the first axial piston surface and the piston bore located radially inward of the outer recess diameter;
a sleeve extending longitudinally from a first sleeve end to a second sleeve end, the first sleeve end sized to be received within the recess; and
a shuttle having a stem extending longitudinally along a stem axis collinear with the chamber axis, the shuttle having a flange projecting radially outwardly from the stem relative to the chamber axis, the flange defining an axial flange surface at a first axial location of the stem, the stem defining an axial landmark at a second axial location of the stem, the piston body and the sleeve axially stacked onto the flange such that the first axial piston surface lays against the axial flange surface, the first sleeve end is received within the recess and the second sleeve end is located between the second axial piston surface and the axial landmark at the second axial location of the stem.

9. The aircraft engine of claim 8, further comprising a shuttle fastener engageable with the shuttle at the axial landmark to secure the sleeve between the flange and the shuttle fastener.

10. The aircraft engine of claim 9, wherein the axial landmark is an annular groove extending radially inward of the stem.

11. The aircraft engine of claim 8, wherein the recess and the first sleeve end respectively define complementary anti-rotational features cooperable to hinder rotation of the piston body and the sleeve relative to one another about the chamber axis.

12. The aircraft engine of claim 8, further comprising a sleeve fastener engaged with the piston body and the sleeve to hinder axial movement of the piston body and the sleeve relative to one another along the chamber axis.

13. The aircraft engine of claim 12, wherein the piston body and the sleeve respectively define a first keyway in communication with the recess and a second keyway proximate to the first sleeve end, the first sleeve end being received within the recess, the first keyway and the second keyway being in register and the sleeve fastener extending from inside the first keyway to inside the second keyway.

14. The aircraft engine of claim 8, wherein the junction between the first axial piston surface and the piston bore is sized to accommodate a junction between the axial flange surface and the stem.

15. The aircraft engine of claim 8, wherein the junction between the first axial piston surface and the piston bore is a first recess of the piston body defined axially inwardly from the first axial piston surface, the recess being a second recess of the piston body, the piston body and the sleeve sized relative to one another such that the first sleeve end is receivable axially within the second recess by a depth greater than within the first recess.

16. The aircraft engine of claim 8, wherein the recess and the first sleeve end have complementary crenelated shapes.

* * * * *